Aug. 11, 1970 J. C. KOMP 3,523,859
ADHESIVE TAPE PRODUCTS
Original Filed March 8, 1965
2 Sheets-Sheet 1
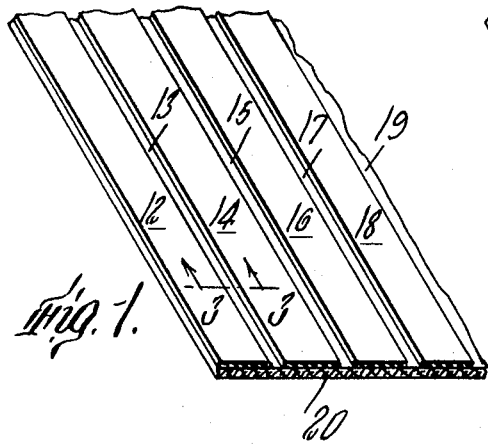
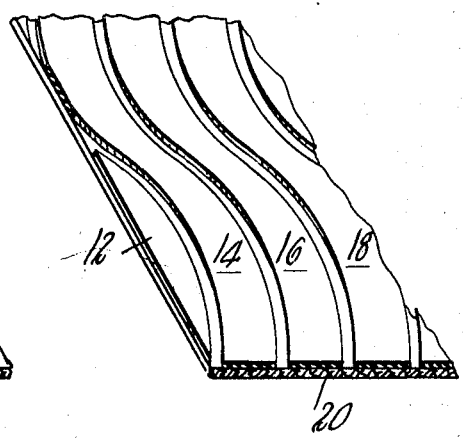
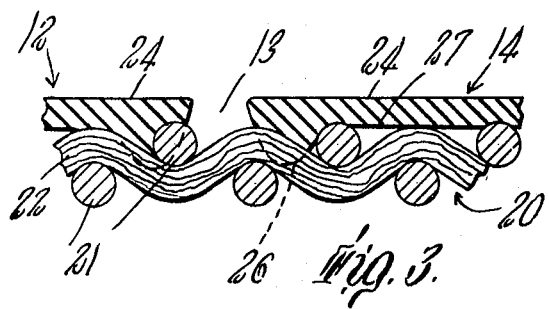
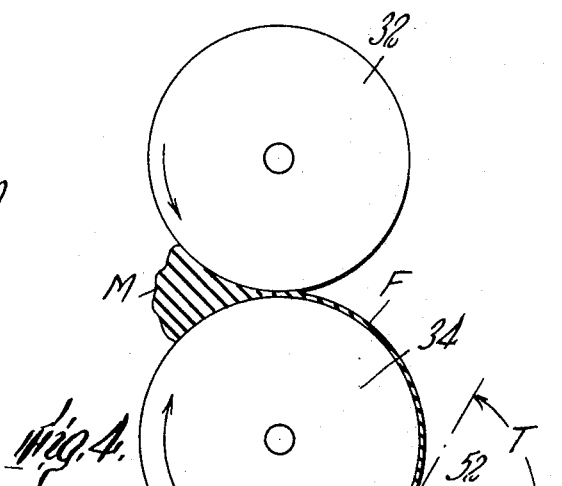
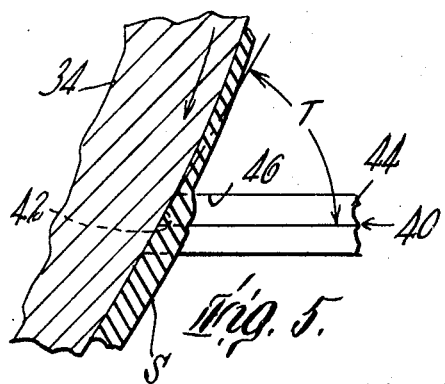
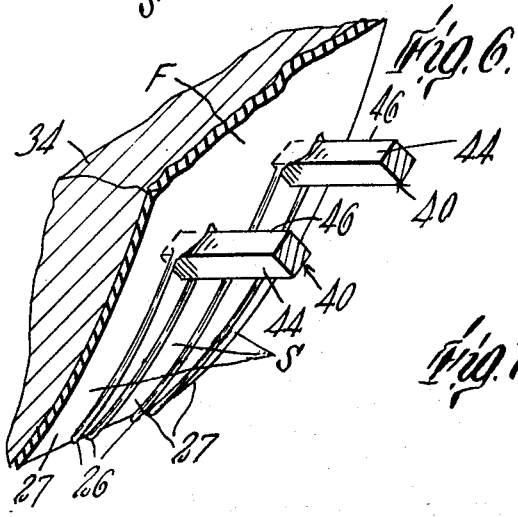
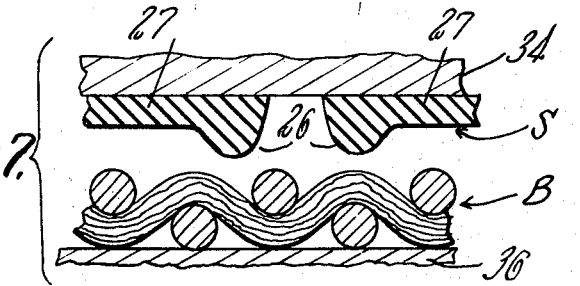

Aug. 11, 1970   J. C. KOMP   3,523,859
ADHESIVE TAPE PRODUCTS
Original Filed March 8, 1965   2 Sheets-Sheet 2

United States Patent Office 3,523,859
Patented Aug. 11, 1970

3,523,859
ADHESIVE TAPE PRODUCTS
Joseph C. Komp, Bowling Green, Ky., assignor to The Kendall Company, Boston, Mass., a corporation of Massachusetts
Continuation of application Ser. No. 437,813, Mar. 8, 1965. This application Dec. 11, 1968, Ser. No. 786,815
Int. Cl. C09j 7/04; B32b 33/00
U.S. Cl. 161—94     3 Claims

ABSTRACT OF THE DISCLOSURE

Adhesive tape comprising a pervious backing sheet and a plurality of spaced pressure-sensitive adhesive film strips positioned on the backing sheet providing continuously extending slots therebetween, said strips having a flat smooth outer surface and an inner surface of greater film thickness at its edges than in its central portion in contact with the backing sheet, said film at the edges penetrating the backing sheet to a greater depth than the film between the edges, providing a greater degree of bonding between the film and the backing sheet along the edges of the strips throughout their length to provide a high degree of resistance to delamination along the edges of said strips. Preferably, the strips extend in a sinuous pattern back and forth across said backing sheet and the backing sheet has warp and filling yarns, and the amplitude of the sinuous pattern of the strips is such that the slots extend back and forth across at least one of the warp yarns.

---

This is a continuation application of application Ser. No. 437,813, filed Mar. 8, 1965, and now abandoned.

This invention relates to novel pervious pressure-sensitive adhesive tape products and the like.

Pressure sensitive adhesive tapes of the type having a woven or other fabric backing with a pressure-sensitive adhesive film adhered to one side thereof have been in wide use for many years, although it has long been known that their lack of air permeability was disadvantageous, particularly in the case of hospital and athletic tapes, in that it caused skin maceration because moisture was unable to pass through the impervious adhesive film. Although attempts have heretofore been made to remedy the situation by providing an adhesive tape having openings therein, such tapes or their methods and apparatus of manufacture have been deficient in one or more respects, for example, by introducing contaminating materials during the formation of the tape, or causing manufacturing difficulties which increased the cost of the tape to an uneconomic degree.

Accordingly, it is the major object of the present invention to produce a novel pervious adhesive tape product which not only is free of contaminating materials and of manufacturing difficulties as well, but which has a high degree of air and moisture permeability even when used in more than one layer.

Other objects and features of the present invention will become apparent from the following detailed description of preferred embodiments thereof, together with the accompanying drawings, wherein:

FIG. 1 is an isometric view of an adhesive tape according to the present invention;

FIG. 2 is an isometric view of an adhesive tape according to the invention somewhat modified from that of FIG. 1;

FIG. 3 is an enlarged cross-section of a portion of the tape of FIGS. 1 and 2;

FIG. 4 is a somewhat diagrammatic side elevation of apparatus according to the invention for carrying out the process thereof;

FIG. 5 is a detail cross-section of a portion of the apparatus of FIG. 4;

FIG. 6 is an isometric detail view of a portion of the apparatus of FIG. 4, showing one aspect of the process of the invention;

FIG. 7 is a cross-section of a portion of the apparatus of FIG. 4, taken on the line 7—7 thereof, showing another aspect of the process of the invention;

Figure 8:
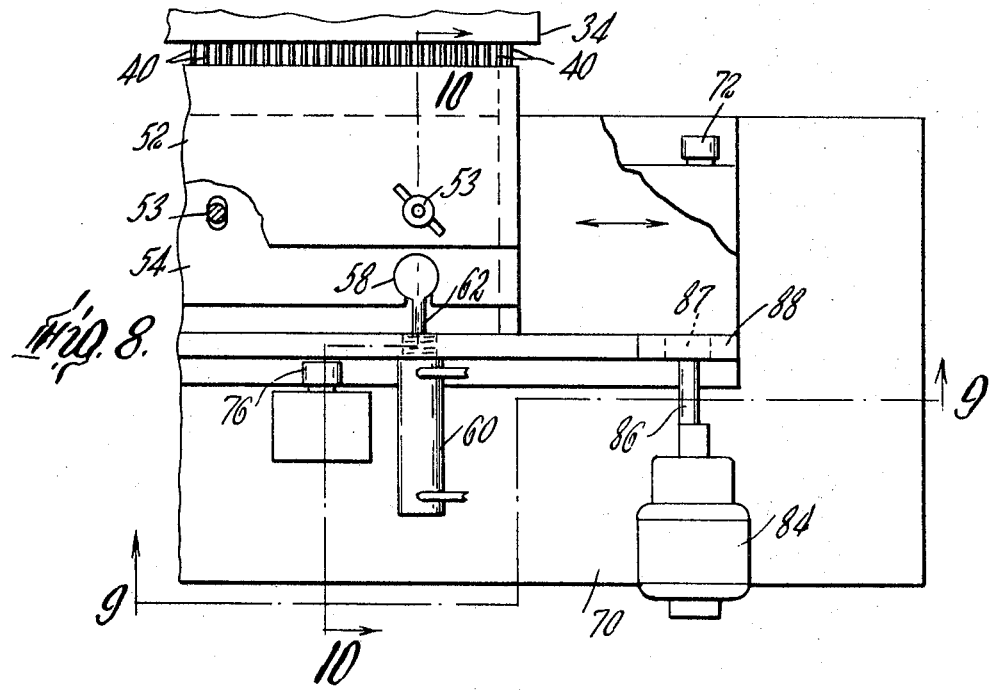
FIG. 8 is a plan view, partly broken away, of the apparatus of FIG. 4.

Referring to FIGS. 1 and 3, the novel adhesive tape of the invention includes a pervious backing fabric sheet, generally designated 20, with a plurality of continuous adhesive film strips 12, 14, 16 and 18, each of uniform width and transversely spaced from one another by openings 13, 15, 17 and 19, respectively, said strips being pressure united to sheet 20. The sheet 20 may be of any suitable pervious material, preferably a fabric woven of natural or synthetic textile fibers having warp yarns 21 and filling yarns 22. Pervious non-woven backing sheets of textile or other fibers or other types of pervious backing sheets may be used but the invention as to certain of its aspects is particularly applicable to woven fabric backing sheets. The adhesive film strips 12, 14, 16 and 18 are composed of a tacky, cohesive rubbery material, the composition of which is well known in the art, with flat smooth calendered outer surfaces 24 and inner surfaces having edge portions 26 of greater film thickness than the central portions 27 therebetween. With such novel configuration, the adhesive film edge portions 26 penetrate the yarns 21, 22 of backing sheet 20 a greater depth than do the central portions 27, thus providing a greater degree of bonding between the strips along their edges throughout the entire length thereof. This provides a high degree of resistance to delamination along the edges of the strips as might otherwise occur when pulling the tape from a roll thereof, and such is achieved with the structure of the tape of the present invention without utilizing an unusually thick film throughout the transverse dimension of the strips, rather only at the edges thereof.

As shown in FIG. 2, the strips preferably extend in a sinuous pattern of limited amplitude preferably more than about the width of a strip transversely back and forth across at least one of the warp yarns 21, the strips 12', 14', 16' and 18' of FIG. 2 being of a sinusoidal pattern, with an amplitude slightly more than the width of a strip and of a relatively short wavelength of about an inch, although much longer wavelengths of the order of several yards may be utilized. With a woven backing, and an amplitude sufficient for the traversing of at least one warp yarn by the openings 13', 15', 17' and 19', sinuously extending strips effectively prevent continuous raveling of a yarn at the edge of a tape, which might otherwise occur because of the slitting into narrow strips for packaging cannot be carried out without causing severing of one or more warp yarns sufficient to initiate raveling whenever the slitting occurs along a slot wherein the yarns are not bonded to the backing as frequently occurs.

The tape of either FIG. 1 or FIG. 2 is utilized in the usual manner, conventionally in the form of an indeterminate long length wound up onto a roll, from which it may be dispensed in short lengths or may be wound in several overlapping turns about a portion of a human limb, for example. In such a case, the continuous openings of the tape of the present invention provide a unique advantage, since with a strip width of about ⅛ to ¼ inch and opening width of 0.015 to 0.075 inch, overlapping turns with successive turns at but a slight angle will cause the continuous slots of the successively applied turns to cross one another so to provide direct adhesive openings through the tape at each such crossing. This greatly improves tape permeability, reducing skin maceration even with multiple layers of tape.

In brief, the novel method of making the tape of FIG. 1 according to the present invention comprises providing a pressure-sensitive adhesive film supported on a moving surface and then separating the film, while the film is supported on said surface, into a multiplicity of continuous transversely spaced strips, each of uniform width throughout its length and of substantially greater thickness at its edges than in its central position and spaced from one another by continuous openings each of uniform width through its length. This is uniquely accomplished according to the invention by causing lateral flow of the adhesive throughout the depth of the film at each of a plurality of discrete fixed transversely spaced positions corresponding to the openings continuously to form said openings by displacing film material from said positions laterally to the edges of the strips as the film moves past said positions, creating the openings and providing a greater thickness of film at the edges of the strips continuously therealong. Thereafter, the unsupported side surface of the strips, while separated by said openings and while supported on their other side surfaces by the moving surface is pressed into contact and pressure united with the surface of the pervious fabric to bond the adhesive strips to the fabric by penetrating the fabric with the material of the strips to a greater degree at the strip edges, while avoiding closing of the openings.

Apparatus for carrying out the above described process and modifications thereof as hereinafter described is shown in FIGS. 4 through 10.

In general, it comprises a three roll stack of rotating calender rolls, upper roll 32, intermediate roll 34 and lower roll 36, driven by suitable means (not shown) known to the art. Intermediate roll 34 is heated to a greater degree and is rotated faster than is upper roll 32, so that the upper and intermediate rolls comprise a pair of rotating calender rolls having heated, imperforate, essentially non-yielding surfaces for calendering a mass M of heat softenable thermoplastic adhesive, while in a heat-softened state, into a pressure sensitive adhesive film F. The surface of intermediate roll 34 is maintained at a temperature sufficiently high to keep the film supported thereon in an inelastic, flowable heat softened condition. Lower roll 36 is rotated at the same speed as intermediate roll 34 and provides a moving surface for carrying backing sheet B into contact with the adhesive film supported on the surface of intermediate roll 34 and pressure uniting it with said backing sheet, providing a pressure-sensitive adhesive coated fabric L which is thereafter led from lower roll 36 for cooling, slitting and packaging. The apparatus as above set forth, being well known and long used in the art, need not be further described.

According to the present invention, means are provided for separating film F, while it is supported on the surface of intermediate roll 34, into a multiplicity of strips S transversely spaced from one another in a direction parallel to the roll axis to provide discrete openings therebetween. Such means comprises a multiplicity of fixed plough elements, generally designated 40, transversely spaced across intermediate roll 34, said plough elements having shanks arranged at a trailing angle to the surface of roll 34 with slightly arcuate generally flat bottom surfaces 42 at an angle to said shanks such that said bottom surfaces are generally tangential to the surface of roll 34 and in contact therewith. Preferably plough elements 40 are provided with side surfaces 44 converging into an edge 46 for presentation to the film F passing therearound, and may be generally square in cross-section with one of its diagonals along the direction of film advance, as shown in FIG. 6, although it is contemplated that other plough element configurations may be used as well. The plough elements may be about 0.025 to 0.100 in their transverse dimensions, and be spaced about ⅛ to ⅜ inch.

Figure 9:
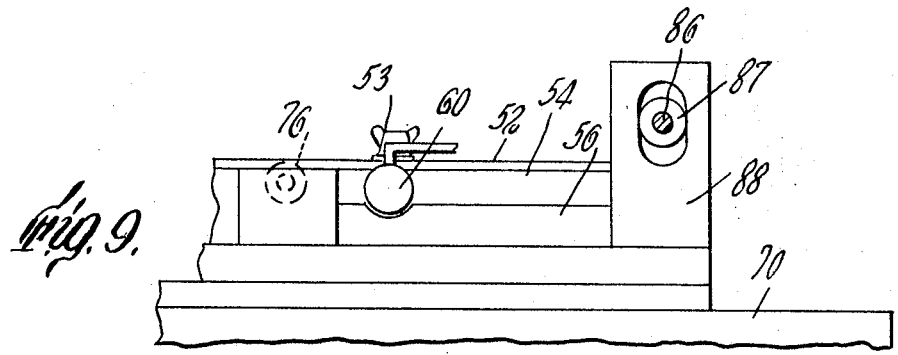
FIG. 9 is an end elevation, partly broken away, of the apparatus of FIG. 4.
Figure 10:
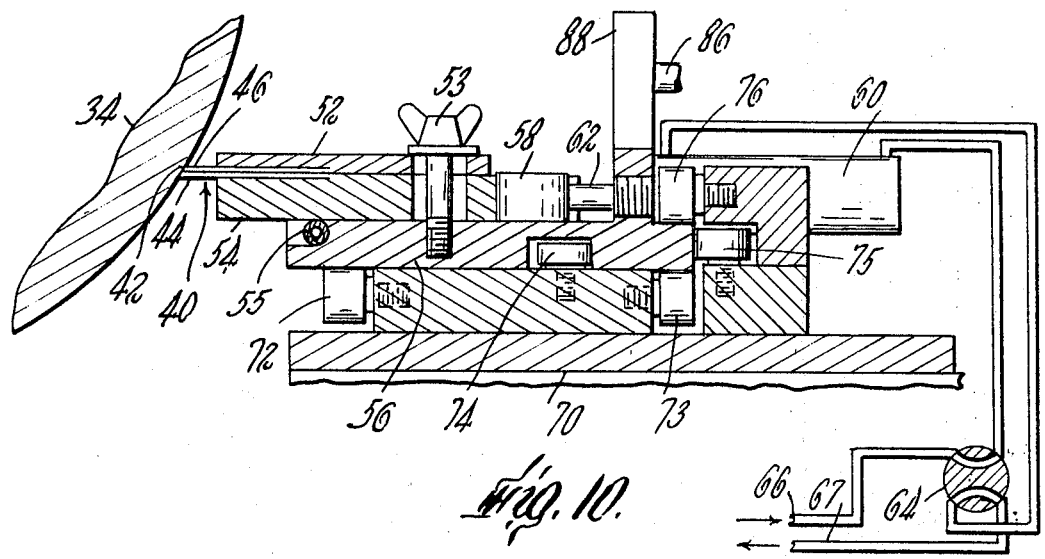
FIG. 10 is an enlarged cross-section of the apparatus of FIG. 4 taken on line 10—10 of FIG. 8.

The multiplicity of plough elements is supported in side by side relationship in a pair of clamps, upper clamp 52 and lower clamp 54, extending across roll 34 the latter being provided with an electric heater element 55, one end of such clamps and of the apparatus being shown in FIGS. 8 and 9. A plurality of thumb screws 53 are provided for holding upper clamp 52 firmly against lower clamp 54 to retain plough elements 40 therebetween.

Lower clamp 54 with upper clamp 52 and plough elements 40 are supported and guided both for transverse reciprocating movement of limited amplitude generally axially of roll 34 to produce the sinuous openings and to prevent grooving of the roll surface and for radial movement of roll 34, so that plough elements 40 may be maintained in pressure contact with said roll, or alternatively, may be moved to an inoperative position with their bottoms spaced from the roll surface so as to clear any film thereon.

To make this possible, lower clamp 54 is mounted in sub-base 56 for limited sliding movement in a direction radially of intermediate roll 34, such movement being produced by a double acting hydraulic cylinder 60 mounted on sub-base 56 and having its piston 62 mounted at its free end on lower clamp 54 by cylindrical block 58. A valve 64 is provided for alternatively connecting the opposite chambers of said cylinder to a source of hydraulic pressure at 66 or exhaust at 67.

Sub-base 56 is itself mounted on machine base 70 for limited reciprocating movement in a direction generally axially of intermediate roll 34 by means of supporting and guiding rollers 72, 73, 74, 75, 76, the reciprocating movement being provided by an eccentric mechanism driven by motor 84 mounted on base 70, such mechanism consisting of a crank arm 86 on the motor shaft carrying a crank roller 87 received in a cooperating vertically slotted member 88 mounted on sub-base 56.

During operation of the apparatus of the invention, with the calendar rolls 32, 34, 36, being rotated, motor 84 preferably operated to reciprocate plough elements 40 to a limited extent, say about ⅛ to ⅜ inch, roughly the same as the plough element spacing, and valve 64 operated so that hydraulic cylinder 60 will continuously maintain the bottom surfaces 42 of plough elements 40 in pressure contact with the surface of roll 34, the apparatus of the invention will continuously produce a permanently pervious pressure-sensitive adhesive coated fabric, such as that shown in FIG. 2, for example, upon providing an adhesive mass M and fabric backing B to such apparatus.

More specifically, the upper and intermediate calender rolls 32 and 34, respectively, operate on the mass M of adhesive material to calender it into a pressure sensitive film of perhaps 3 to 10 mils thickness, such film being supported and carried on the surface of the intermediate roll 34 which roll is heated to a higher temperature than is upper roll 32 to prevent adherence of the film to the latter and to maintain it while on roll 34 in an inelastic, flowable, heat-softened condition.

With the film so maintained and supported on the surface of roll 34, it is advanced to the reciprocating but rotatably fixed plough elements 40 which have their bottom surfaces 42 in running contact with the moving surface of said roll. As illustrated with particular clarity in FIGS. 5 and 6, the pointed leading edges 46 of the plough elements separate the continuous film F advancing thereto into a plurality of continuous strips S, each of uniform width or about ⅛ to ⅜ inch throughout its length and of substantially greater thickness at its raised edges 26 than in its central portion 27, the openings between such strips also extending continuously and being of uniform width of about 0.015 to 0.075 inch, throughout their length slightly less than the dimension of the plough element 40 by which it was formed. Both the strips S and the openings therebetween preferably extend somewhat sinuously with respect to the direction of their advance with roll 34, by reason of the preferred limited reciprocating movement of plough elements 40.

More specifically as to plough elements 40, it is preferable that they be maintained at a temperature, by means of heater element 55, which need be but say 10 to 15 degrees F. higher than the temperature of the surface of roll 34 which may be at a temperature of about 200 degrees F. or somewhat higher. With such a slight temperature difference, not enough to cause deterioration of the film and by reason of the trailing angle at which edge 46 is presented to the film, accumulation of film material on the plough elements 40 does not occur. Thus, the plough elements 40 are enabled to operate indefinitely without the use of release agents which cause contamination of the film, to cause lateral flow of the adhesive moving past them continuously to form openings in the film by removing film from the area of the openings and displacing it laterally to the edges of the strips, providing the unique raised edges providing greater film thickness thereat as is characteristic of the invention.

The film strips S so produced, still carried on the surface of roll 34, are then advanced into contact with and pressure united to a fabric backing strip B carried on the surface of lower roll 36 at the same speed, FIG. 7 showing the condition of the two laminates just prior to their being so pressure united and FIG. 3 the condition thereafter. More specifically, and as shown by said figures, the surface of the adhesive strips not in contact with intermediate roll 34, that is, the surface having its edge portions 26 raised with respect to its central portion 27, is pressed into contact with one surface of the backing sheet B, while the other surfaces of both strips S and backing sheet B are supported by its smooth surfaces of rolls 34 and 36, respectively. This provides the unique penetration of the yarns of the backing sheet to a greater degree at the edges 26 of the strips S, while maintaining the openings, and while maintaining the other surface of the film, its roll contacting surface 24, in smooth flat calendered condition for the most effective functioning of the pressure-sensitive adhesive action thereof.

After such pressure uniting to provide the permanently pervious pressure-sensitive adhesive tape of the invention, it is removed from the surface of lower roll 36 for suitable cooling, slitting and packaging as desired.

The plow element 40 need not scrape the surface of the roll 34 completely clean of adhesive in the slots separating the strips S. In operation, it has been observed that a very thin, practically invisible, veil-like layer of adhesive may span the slots in contact with the surface of the roll 34. Such thin layer advantageously may serve as a lubricant between the bottom surface 42 of plough element 40 and the surface of intermediate roll 34, serving to reduce wear on these surfaces. The thin film of adhesive may either remain on the surface of the roll 34 to be returned to the bulk mass M after the pressure laminating step at the nip between rolls 34 and 36 or be transferred to the fabric during the laminating step. The thin film ruptures either during the laminating step or subsequent thereto, at which time it ruptures or contracts to a highly porous and open state that does not detract from the natural porosity of the backing in the slot areas. In some instances, the adhesive in the slot areas may be desirable in serving to bind together fibers cut in the slot areas upon slitting. It appears that the formation of the lubricating thin layer of adhesive depends upon the softness of the mass and the pressure at which the plough elements are urged toward the surface of the roll 34. The tendency for the adhesive in the slot area to transfer to the backing is greater in the case of softer adhesives and smaller slot widths.

Various modifications of the novel adhesive tape products of my invention, as well as the novel methods and apparatus of my invention for manufacturing same, all within the spirit of my invention and the scope of the appended claims, will be apparent to those skilled in the art.

I claim:
1. Adhesive tape comprising
   a pervious backing sheet and
   a plurality of spaced pressure sensitive adhesive film strips positioned on said backing sheet providing continuously extending slots therebetween
   said strips having a flat planar smooth outer surface and an inner surface of greater film thickness at its edges than in its central portion in contact with said backing sheet, said film at said edges penetrating said backing sheet to a greater depth than said film between said edges providing a greater degree of bonding between said film and said backing sheet along the edges of said strips throughout their length providing a high degree of resistance to delamination throughout said strips.
2. Adhesive tape as claimed in claim 1 wherein said strips extend in a sinuous pattern back and forth across said backing sheet.
3. Adhesive tape as claimed in claim 2 wherein said backing sheet has warp and filling yarns, and the amplitude of the sinuous pattern of said strips is such that said slots extend back and forth across at least one of said warp yarns.

References Cited
UNITED STATES PATENTS

| | | | |
|---|---|---|---|
| 1,630,597 | 5/1927 | Banff | 128—268 |
| 2,054,448 | 9/1936 | Russell. | |
| 2,310,082 | 2/1943 | Holbrooke | 128—156 |
| 2,349,709 | 5/1944 | Evans | 117—44 |
| 2,510,120 | 6/1950 | Leander | 117—122 |
| 2,740,403 | 4/1956 | Schueler | 128—156 |
| 2,779,526 | 1/1957 | Vogt | 229—34 |
| 2,940,868 | 6/1960 | Patchell | 117—38 |
| 3,033,702 | 5/1962 | Fenselau | 117—38 |

FOREIGN PATENTS

| | | |
|---|---|---|
| 546,065 | 9/1957 | Canada. |
| 1,085,317 | 1/1955 | France. |

WILLIAM D. MARTIN, Primary Examiner

B. D. PIANALTO, Assistant Examiner

U.S. Cl. X.R.
117—122; 156—257; 161—146, 167